United States Patent [19]

Izumi et al.

[11] 4,354,751
[45] Oct. 19, 1982

[54] EXPOSURE SYSTEM FOR A CAMERA

[75] Inventors: Tatsuro Izumi; Nobuyuki Taniguchi, both of Sakai; Toshiaki Matsumoto, Izumisano; Masatake Niwa, Sakai; Tokuji Ishida, Daito; Masatoshi Itoh, Sakai, all of Japan

[73] Assignee: Minolta Camera Kabushiki Kaisha, Osaka, Japan

[21] Appl. No.: 244,924

[22] Filed: Mar. 18, 1981

[30] Foreign Application Priority Data

Mar. 18, 1980 [JP] Japan ............... 55-35645
Dec. 24, 1980 [JP] Japan ............... 55-184883

[51] Int. Cl.³ .............. G03B 7/16; G03B 15/05
[52] U.S. Cl. ................. 354/139; 354/147; 354/149
[58] Field of Search ............ 354/27, 32–35, 354/60 F, 126, 129, 132, 139, 141, 145–149; 315/241 P

[56] References Cited

U.S. PATENT DOCUMENTS

| | | | |
|---|---|---|---|
| 3,752,046 | 8/1973 | Sato | 354/141 |
| 3,782,258 | 1/1974 | Boekkooi et al. | 354/132 X |
| 3,886,568 | 5/1975 | Yazaki et al. | 354/149 |
| 4,034,387 | 7/1977 | Ohtaki et al. | 354/149 X |
| 4,174,161 | 11/1979 | Mashimo et al. | 354/139 |

*Primary Examiner*—William B. Perkey
*Attorney, Agent, or Firm*—Wenderoth, Lind & Ponack

[57] ABSTRACT

An exposure system for use in a camera includes a light emitting apparatus which is capable of selectively projecting a first type of light which flashes instantaneously with a predetermined light quantity and a second type of light which flashes for a prolonged period of time with a predetermined constant light intensity, and a selecting circuit for selecting the first type of light when a target object to be photographed is located a predetermined distance away from the camera, and the second type of light when the target object is located closer to the camera than the predetermined distance.

15 Claims, 13 Drawing Figures

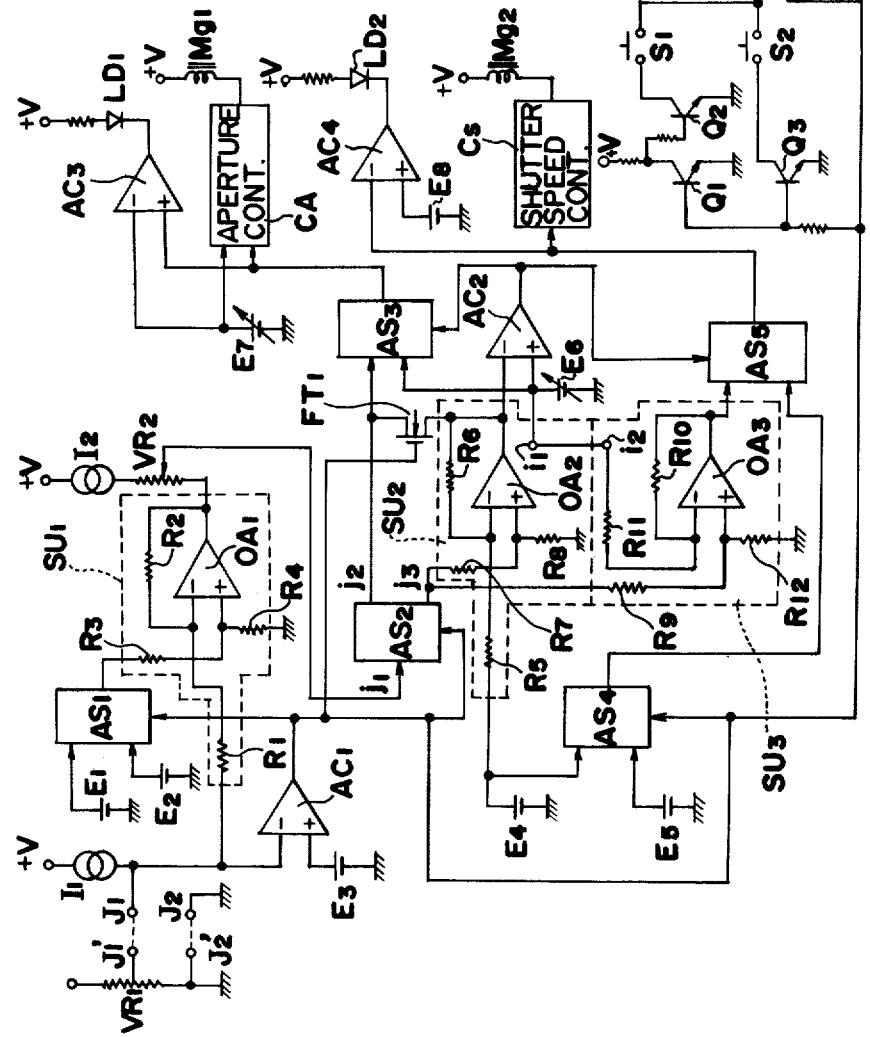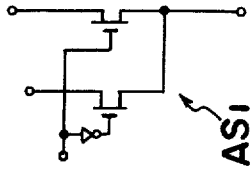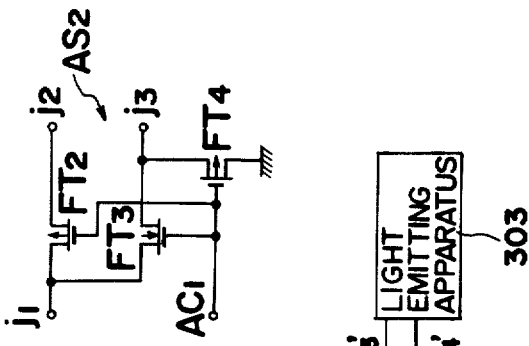

EXPOSURE SYSTEM FOR A CAMERA

BACKGROUND OF THE INVENTION

The present invention relates to an exposure system for use in a camera provided with an auxiliary light for carrying out proper photography and, more particularly, to an exposure system which has a greater choice of combinations of the exposure mode and the mode of flash light produced from the auxiliary light than that of conventional exposure systems.

Conventionally, there have been proposed three different exposure systems for carrying out photography using a flash light with an automatic control of flash light intensity or of aperture size of the camera. The first system is a type in which the aperture size is automatically controlled relative to the change of camera-to-object distance with a flash light apparatus producing a constant intensity of flash light. This first system is called Flash'o-matic. The second system is a type in which the light intensity of the flash light is automatically controlled relative to the camera-to-object distance and relative to the reflectance of the object to be photographed with the aperture being set to a predetermined size. The third system is a type in which the light intensity of the flash light is automatically controlled relative to the camera-to-object distance and relative to the reflectance of the object with the use of the measured value of reflected light on the light-sensitive film and the aperture being set to any desired size.

Although the first system has an advantage in that it is not necessary to take the reflectance of the object into consideration, the aperture size of the camera is limited within a fixed range and, therefore, limiting the available range of distance in which the object to be photographed can be located. The second system has an advantage in that it is possible to take a photograph of an object which is located very close to the camera; it has, however, a disadvantage in that the fixed aperture size provides no desired depth of field, particularly when taking a photograph of an object which is located close to the camera and has a further disadvantage in that it is necessary to take the reflectance of the object into consideration. The third system also has, in addition to the necessity of taking the reflectance of object into consideration, a disadvantage in that the reflectance of the film itself serves as one element to cause errors in the exposure adjustment.

SUMMARY OF THE INVENTION

Accordingly, it is a primary object of the present invention to provide an exposure system which eliminates the above described disadvantages and broadens the available setting conditions for the exposure adjustment.

It is a further object of the present invention to provide an exposure system which has a light emitting apparatus capable of selectively emitting one of an instantaneous flash light and a prolonged flash light.

In accomplishing these and other objects, an exposure system for a camera according to the present invention comprises a means for projecting an artificial light towards an object. The projecting means is capable of selectively projecting a first type of light which flashes instantaneously with a predetermined light quantity and a second type of light which flashes for a prolonged period of time with a predetermined constant light intensity. A selecting means is provided for selecting the first type of light when a distance to the object is greater than a predetermined standard, and for selecting the second type of light when the distance to the object is less than the standard.

BRIEF DESCRIPTION OF THE DRAWINGS

These and other objects and features of the present invention will become apparent from the following description taken in conjunction with preferred embodiments thereof with reference to the accompanying drawings, in which:

FIG. 4 is a circuit diagram of an embodiment of a control circuit according to the present invention;

FIGS. 5a and 5b are circuit diagrams of analogue switches employed in the circuit of FIG. 4;

DETAILED DESCRIPTION OF THE PREFERRED EMBODIMENTS

Figure 1:
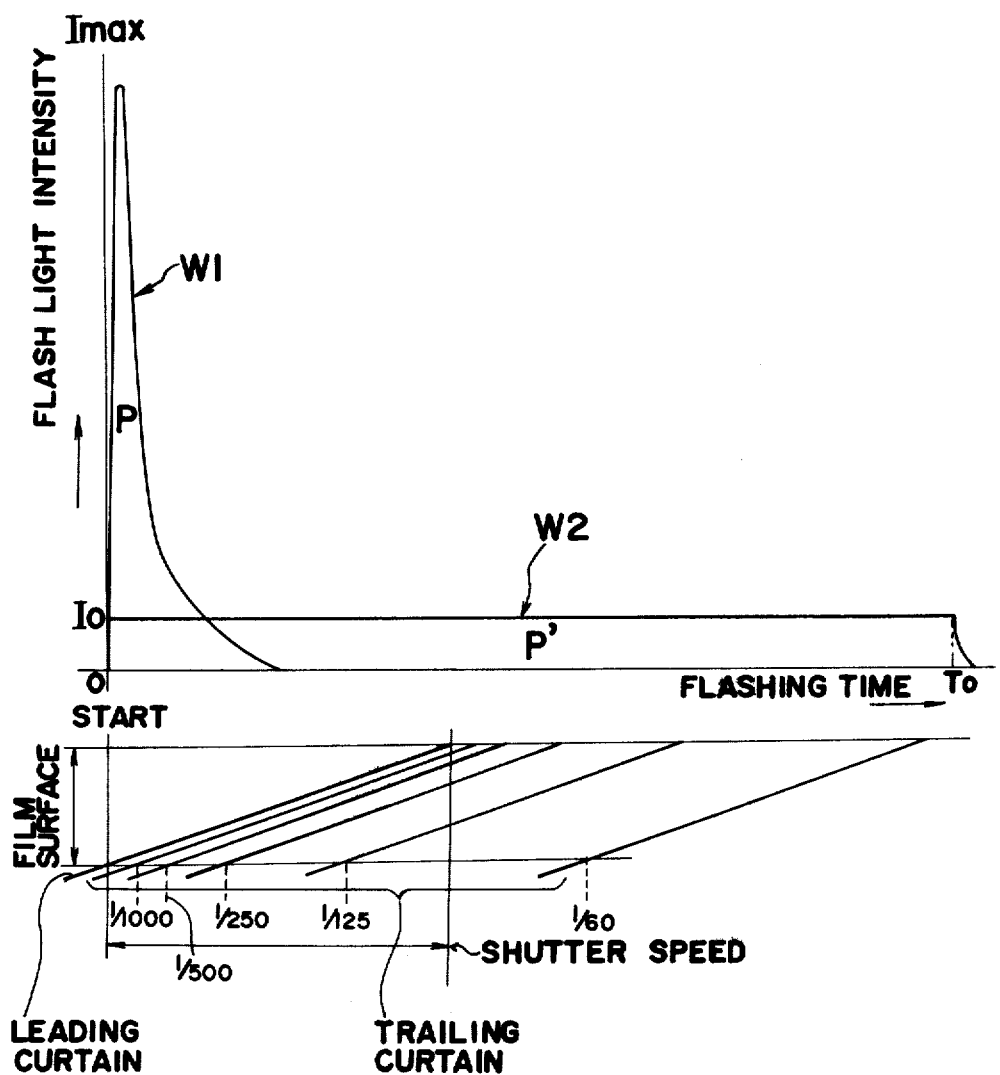
FIG. 1a is a graph showing waveforms of instantaneous flash light and prolonged flash light.
FIG. 1b is a graph showing the movement of leading and trailing curtains of a shutter mechanism.

Referring to FIG. 1a, there are shown two waveforms W1 and W2 of light intensity of flash light which have both been emitted from a light emitting apparatus which will be described later in connection with FIG. 6. The waveform W1 is obtained when an instantaneous flash light having a very short flashing period and very high light intensity Imax is produced and the waveform W2 is obtained when a prolonged flash light having a considerably longer flashing period To and a considerably lower and constant light intensity Io is produced. It is to be noted that the time period To is set to be not less than a time period from the very beginning of the opening of a shutter mechanism to the complete closure of the same. For example, in the case of focal plane shutter, the flashing period To starts from the moment when the leading curtain starts to move and ends at the moment when the trailing curtain completely closes, as shown in FIG. 1b. Therefore, the flashing period To is greater than the sum of a time period necessary for the leading curtain to move over the film surface and a time period of the shutter speed which is shorter than the synchronizing shutter speed. If the flashing period To is shorter than such a sum, there will be an irregularity in the exposure. In FIG. 1a, reference characters P and P' represent total light amount produced from the light emitting apparatus for the instantaneous and prolonged flash light, respectively, and the relationship therebetween is normally $P \geq P'$.

Generally, the relationship between the light amount P, the aperture value F, the distance L between the light emitting apparatus and an object to be photographed, and the film sensitivity, or film speed, S can be expressed as follows:

$$a \sqrt{S \cdot P} = F \cdot L \qquad (1)$$

wherein a is a constant. When $S = 2^{Sv}$, $F = \sqrt{2^{Av}}$ and $L = 2^{Lv}$, and by taking the logarithm, the equation (1) can be expressed as follows:

$$Av = Sv - 2Lv + \log_2 P + 2 \log_2 a. \qquad (2)$$

Furthermore, the light amount produced from the light emitting apparatus is generally given by a number called a guide number with an ASA number of 100 corresponding to $S = 2^5$ in the equation (1). Therefore, the guide number $GN(=2^{Gv})$ can be expressed as follows:

$$GN = a \sqrt{2^5 \cdot P} = 2^{Gv}. \qquad (3)$$

From the equation (3), the following equation is obtained:

$$2Gv - 5 = \log_2 P + 2 \log_2 a. \qquad (4)$$

Thus, from the equations (2) and (4), $$Av = 2(Gv - Lv) + (Sv - 5) \qquad (5)$$

is obtained. This equation (5) is a formula for calculating the aperture size by the parameters of guide number, distance to the object, and film sensitivity, as carried out in the Flash'o-matic.

In the case of the prolonged flash light, a further parameter of shutter speed is taken into consideration for determining the aperture size, as described below.

When the amount of light that actually reaches the film surface is expressed as an effective light amount Pe' with the shutter speed being $T(2^{-Tv})$, the effective light amount Pe' can be given by a following equation:

$$Pe' = Io \cdot T = Io \cdot 2^{-Tv}. \qquad (6)$$

When assuming that $P \approx Pc'$, P in the equation (2) can be replaced by Pe', thus $$Av = Sv - 2Lv - Tv + (\log_2 Io + 2 \log_2 a) \qquad (7)$$

is obtained. By putting $\log_2 Io + 2 \log_2 a = 2k$ (k is a constant determined by the light intensity Io), the equation (7) can be expressed as:

$$Av = 2(k - Lv) + Sv - Tv. \qquad (8)$$

This equation (8) is a general formula for determining the aperture size (or shutter speed) using the parameters of the distance to the object, the film sensitivity and the shutter speed, under the prolonged flash light.

From the equations (6) and (3), $$GNe = a \sqrt{2^5 \cdot Io \cdot T} \qquad (9)$$

is obtained. By putting $Io \cdot To = P$ in the equation (9), $$GNe = a \sqrt{2^5 \cdot P} \times \sqrt{T/To} = GN \cdot \sqrt{T/To} \qquad (10)$$

is obtained. In the equation (10), GNe represents an effective guide number under the prolonged flash light with a shutter speed T.

Figure 2:
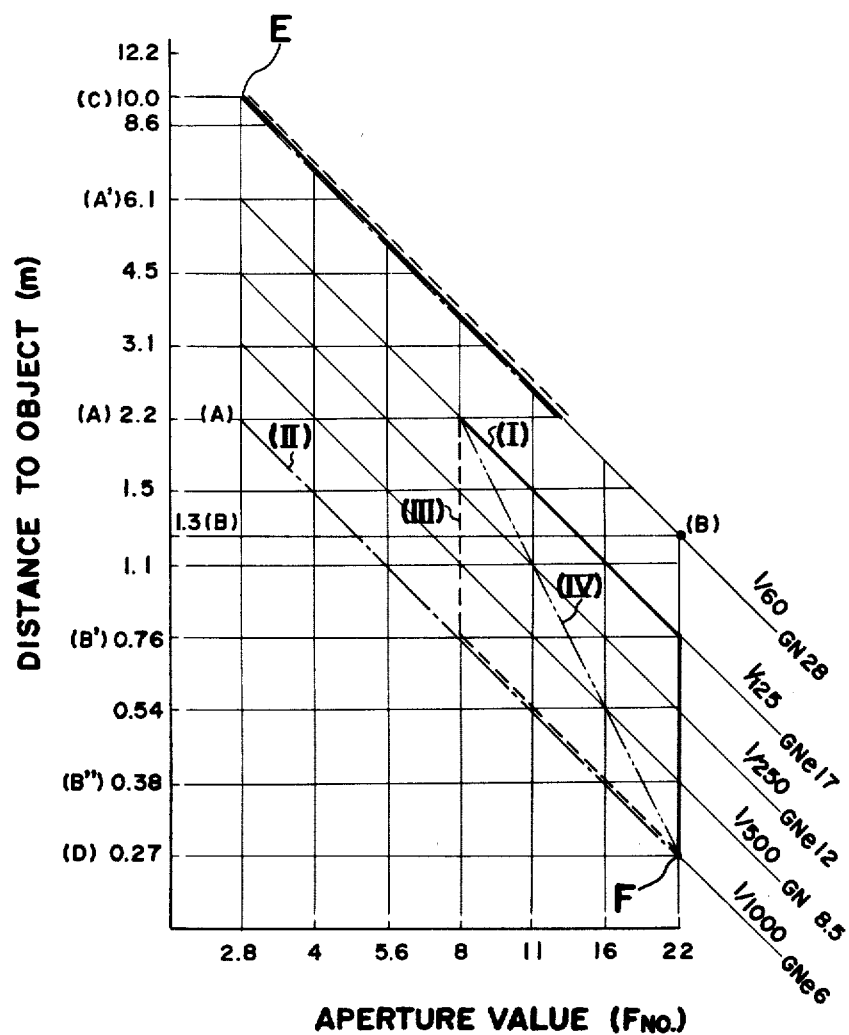
FIG. 2 is a graph showing the relationship between the aperture value, the shutter speed and the distance to a target object for various programs.

Referring to FIG. 2, a graph showing the relationship between the distance to the object, the aperture size and the shutter speed, with the two types of flash light being employed. As will be understood from the further description, the flash light can be used for objects which are located closer to the light emitting apparatus than the minimum available range fixed for the auto-flash system of conventional Flash'o-matic. Furthermore, the aperture size and shutter speed can be chosen from various combinations which are broader than the conventional systems.

The graph of FIG. 2 is obtained when a light emitting apparatus having a guide number GN = 28 and a lens system having an aperture size controllable between F2.8 and F22 are used, and the light emitting apparatus is so arranged that it produces the instantaneous flash light when the shutter speed is 1/60 second (synchronizing speed) and that the flashing period To of the prolonged flash light is set to be long enough to cover a shutter speed of 1/125 of a second or faster. For example, in the case of a focal plane shutter, the prolonged flashing period To is set to be 22 ms long so as to ensure the emission of flash light during the scan of leading curtain over the entire frame, which takes about 13 ms, and during the exposure time which takes about 8 ms for the shutter speed of 1/125 of a second. In the focal plane shutter with the shutter speed being shorter than the synchronizing speed, the film surface is exposed by the scan of a slit constituted by the leading curtain and trailing curtain. The width of the slit is determined by the shutter speed, and is narrowed as the shutter speed is shortened. Therefore, of all the prolonged flash light emitted from the light emitting apparatus and reflected on the object, only the light that has passed through the slit is effectively used for the exposure of the film. Therefore, although the prolonged flash light has an intrinsic guide number, e.g., 28, the effective guide number considered on the film surface is less than the intrinsic guide number. For example, the effective guide number GNe is 6 for the shutter speed 1/1000, about 8.5 for the shutter speed 1/500, about 12 for the shutter speed 1/250, and about 17 for the shutter speed 1/125.

As understood from the graph of FIG. 2, the available shooting range of the light emitting apparatus can be broadened from 10 m (F2.8) to 0.27 m (F22), whereas according to the conventional Flash'o-matic, the shooting range is from 10 m (F2.8) to 1.3 m (F22). In the graph of FIG. 2, a line I depicted by a bold solid line follows a first programmed operation explained below. When the object to be photographed is located between the points C and A, the light emitting apparatus produces the instantaneous flash light which is synchronized to the completion of the opening of the shutter so as to provide enough light to the target object and the surrounding object, as carried out in the Flash'o-matic with GN = 28. In this case, the aperture size is controlled by the equation (5) given above. At the distance A, the shutter speed is changed to 1/125, and the light emitting apparatus changes its mode from an instantaneous flash light emitting mode to a prolonged flash light emitting mode. When the object to be photographed is located between the points A and B', the shutter speed is fixed to 1/125 and the aperture size is determined by the above given equation (8). When the object is located between the points A and B', the light emitting apparatus produces the prolonged flash light having an effective guide number GNe substantially equal to 17. When the object to be photographed is located between the distance B' and distance D, which is the minimum available distance, the aperture size is fixed to the minimum size, i.e., F22 (Avmax), and the shutter speed is determined by the above given equation (8). In this case, the light emitting apparatus produces the prolonged flash light having an effective guide member GNe which is varied relative to the shutter speed. In the first programmed operation I, it is possible to change the point of line shift from the line indicating the shutter speed 1/60 to the line indicating the shutter speed 1/125 to a point anywhere between the distances A' and B.

A single chain line II in FIG. 2 follows another programmed operation which is a first modification of the first programmed operation. When this program II is selected, the shutter speed is fixed to 1/1000 for taking the objects located in the distance range A-D. Therefore, in the distance range A-D, it is possible to adjust the photographic apparatus to operate in a shutter speed priority mode.

A dotted line III in FIG. 2 follows a programmed operation which is a second modification of the first programmed operation. When this program III is selected, the aperture size is fixed to F8 for taking the objects located in the distance range A-B'. Therefore, in this range, it is possible to adjust the photographic apparatus to operate in a aperture size priority mode.

A double chain line IV in FIG. 2 follows a programmed operation which is a third modification of the first programmed operation. In program IV, the shutter speed and the aperture values are both varied relative to the target object located between the distances A and D.

As can be understood from the foregoing description, it is possible to set up a number of programs by taking different courses between points E and F in FIG. 2 for taking a photograph of an object located between distances C and D with the flash light.

Figure 3:
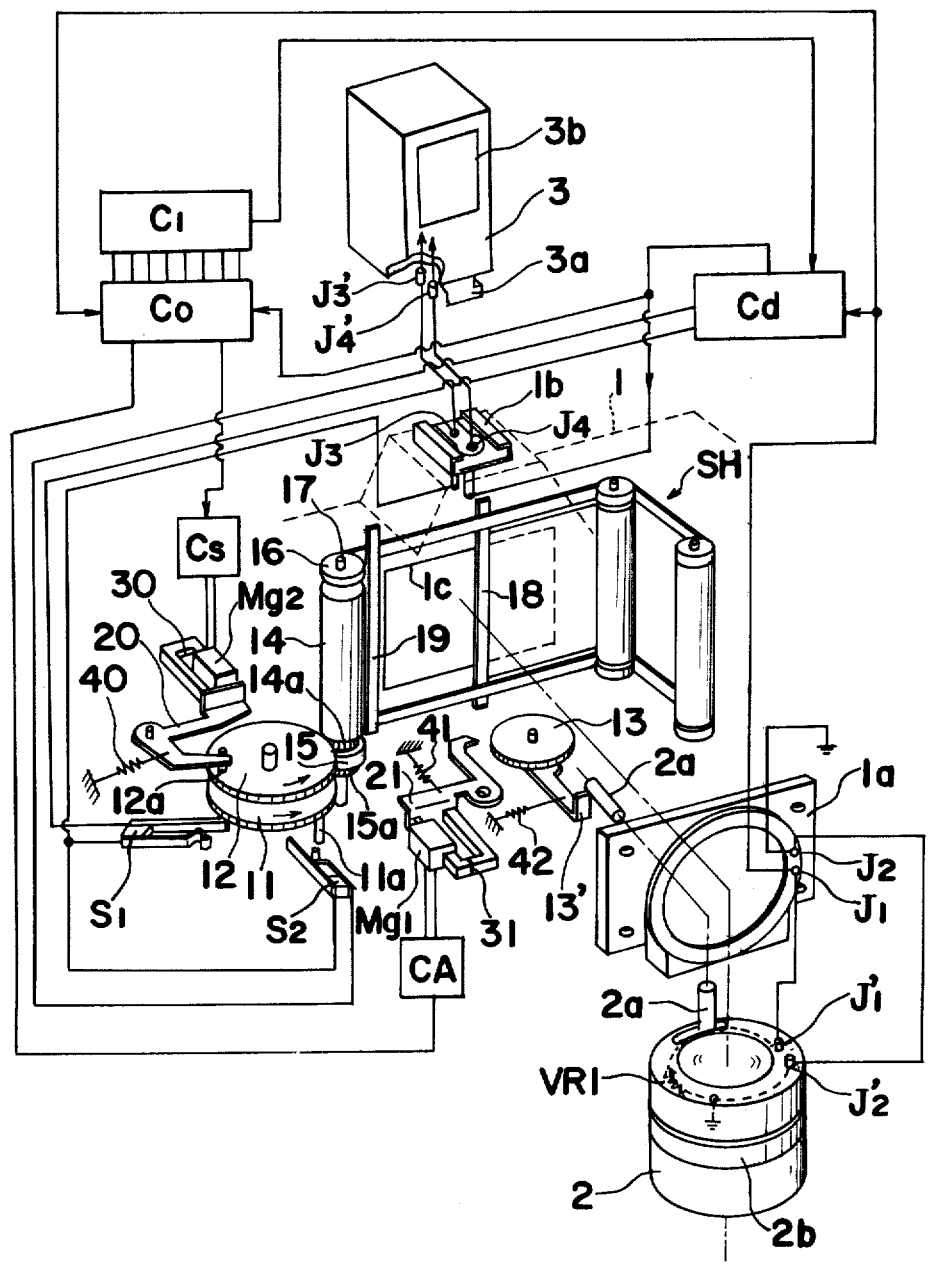
FIG. 3 is a schematic illustration showing an arrangement of a photographic apparatus provided with an exposure system according to the present invention.

Referring to FIG. 3, there is shown a schematic view of a photographic apparatus provided with an exposure system according to the present invention. The photographic apparatus shown comprises a camera body 1 depicted by a dotted line and an objective lens assembly 2 having an aperture controllable between, for example, F2.8 and F22 and being detachably mounted on a front frame 1a of the camera body 1. The lens assembly 2 has a pair of electric terminals J1' and J2' which are electrically connected to corresponding terminals J1 and J2 provided on the front frame 1a of the camera body 1 for transmitting a distance signal, indicative of a distance between the camera body and target object to be photographed, obtained from a variable resistor VR1 which is provided in the lens assembly 2 and varied relative to the turning of a distance setting ring 2b. A light emitting apparatus 3 has a leg portion 3a slidingly inserted into a shoe 1b formed on the camera body 1, and is so arranged as to produce two types of flash light, an instantaneous flash light and a prolonged flash light. The light emitting apparatus 3 has a pair of electric terminals J3' and J4' which are electrically connected to corresponding terminals J3 and J4 provided on the shoe 1b.

Provided inside the camera body 1 is a focal plane shutter mechanism SH comprising a leading curtain control gear 11 and a trailing curtain control gear 12 which are engaged to leading curtain gear 15a and trailing curtain gear 14a, respectively. The leading curtain gear 15a is tightly mounted on a shaft 17 which is tightly or integrally formed with a pair of cylinders 15 and 16 on which the belts of a leading curtain 18 are wound. The trailing curtain gear 14a is fixedly connected to a cylinder 14, and the trailing gear 14a and the cylinder 14 are rotatably mounted on the shaft 17. The cylinder 14 is provided for winding thereon the trailing curtain 19.

A ratchet wheel 13 has an arm 13' radially extending therefrom. A free end of the arm 13', remote from the ratchet wheel 13, is held in contact with a pin 2a extending from the objective lens assembly 2 for controlling the aperture size of the objective lens assembly 2. When the leading curtain control gear 11 is released from the engagement, which has been established by any known engaging means (not shown), the ratchet wheel 13 rotates clockwise by the force of a spring 42 for shifting the pin 2a in a direction effecting the stop down of the aperture size. A permanent magnet 31 which normally holds a bell-crank lever 21 in contact therewith by its attractive force, is provided with an electromagnet Mg1. When the electromagnet Mg1 is excited, the permanent magnet is neutralized so as to lose its attractive force, thereby the resulting in the release of the lever 21. The released lever 21 is rotated clockwise by a spring 41 for effecting the engagement of an end of the bell-crank lever 21 provided with a pawl with the ratchet wheel 13 and, therefore, stopping the rotation of the ratchet wheel 13 and stopping down the aperture to the desired size. A permanent magnet 30 which normally holds a bell-crank lever 20 in contact therewith by its attractive force, is provided with an electromagnet Mg2. When the lever 20 is released by the excitation of the electromagnet Mg2, it is rotated clockwise by the force of a spring 40, resulting in disengagement of the trailing curtain control gear 12 and, thus, resulting in running of the trailing curtain across a film positioning frame 1c.

The photographing apparatus shown in FIG. 3 further comprises an electric circuit including an information setting circuit Cl for storing information regarding: the distance at which the mode of the flash light is changed between the instantaneous flash light and the prolonged flash light, the intrinsic guide number of the flash light emitting apparatus, the light intensity of the prolonged flash light, synchronizing shutter speed, shutter speed under the prolonged flash light mode, the maximum shutter speed, the maximum and minimum aperture values, and the film sensitivity. The information from the information setting circuit Cl is used for determining the program explained above in connection with FIG. 2. It is to be noted that the information regarding the distance and the intrinsic guide number can be set in the flash light emitting apparatus 3.

The electric circuit further includes a determining circuit Cd for determining the type of waveform of the light intensity produced from the light emitting apparatus 3. More particularly, the determining circuit Cd receives distance signals from the variable resistor VR1 in the objective lens assembly 2 and information regarding the distance from the information setting circuit Cl and determines whether the light emitting apparatus should produce the instantaneous flash light or the prolonged flash light.

A calculation circuit Co is provided for calculating, when the discrimination circuit Cd determines that the light emitting apparatus should produce the instantaneous flash light, a proper aperture value using the information regarding the film sensitivity, the intrinsic guide number of the light emitting apparatus and, the synchronizing shutter speed, and for calculating, when the discrimination circuit Cd determines that the light emitting apparatus should produce the prolonged flash light, a proper aperture value using the information regarding the film sensitivity, the distance, the light intensity of the prolonged flash light, and the set shutter speed which is faster than the synchronizing shutter speed, or otherwise calculates a proper shutter speed using the information regarding the film sensitivity, the distance, the light intensity of the prolonged flash light, and the set aperture value.

A circuit Cs is a shutter speed control circuit and a circuit CA is an aperture size control circuit, and these circuits Cs and CA are operated by signals obtained from the calculation circuit Co.

Still referring to FIG. 3, a normally open type switch S1 is provided operatively in association with the leading curtain control gear 11, and it closes when a pin 11a fixedly mounted on the gear 11 comes in contact with a long arm of the switch S1, i.e., when the trailing edge of the leading curtain 18 finishes a complete scan across the frame 1c. A similar type of switch S2 is also provided operatively in association with the leading curtain control gear 11, and it is normally held in the open condition by the pin 11a and is closed when the pin 11a moves away from the switch S2, i.e., prior to the scan of trailing edge of the leading curtain across the frame 1c. Although the switches S1 and S2 operate each time the focal plane shutter mechanism SH is operated, the signal from the switch S1 is disregarded of in the discrimination circuit Cd when the instantaneous flash light is produced, and the signal from the switch S2 is disregarded in the same circuit Cd when the prolonged flash light is produced. More particularly, the signal from the switch S1 is used to start the emitting of the instantaneous flash light, and the signal from the switch S2 is used to start the emitting of the prolonged flash light. it is to be noted that, after the completion of each scan of trailing curtain 19 across the frame 1c, the switches S1 and S2 are returned to their original open condition by any known returning mechanism (not shown).

Next, the operation of the photographing apparatus shown in FIG. 3 is described with reference to the graph of FIG. 2.

After mounting the objective lens assembly 2 and the light emitting apparatus 3 on the camera body 1 and when a main switch (not shown) of the camera and a switch (not shown) for the light emitting apparatus are turned on, the information regarding the intrinsic guide number (GN=28) of the light emitting apparatus, the light intensity (Io) of the prolonged flash light, the minimum aperture value (F2.8) and maximum aperture value (F22) of the objective lens assembly 2, film sensitivity, and the slowest available shutter speed (1/125) and the fastest available shutter speed (1/1000) for the prolonged flash light mode are set up in the information setting circuit Cl.

Also, in the determining circuit Cd, information regarding the distance at which the mode of flash light is changed (in the case of FIG. 2, the distance is equal to 2 m) and the synchronizing shutter speed (1/60 of a second in the case of FIG. 2) are set up, and in the calculation circuit Co, information regarding the maximum aperture value (F22 in the case of FIG. 2) and a desired shutter speed selected from 1/125 and 1/1000 are set up when a shutter priority mode program, such as program I or II, is selected, and information regarding the maximum shutter speed and a desired aperture value (F8 in the case of FIG. 2) are set up when an aperture priority mode program, such as program III, is selected.

Thereafter, when the distance setting ring 2b is turned to bring the target object in the in-focus condition, the distance to the object as obtained by the turning of the distance setting ring 2b is compared with the distance A which has been set up in the information setting circuit Cl by the discrimination circuit Cd. When the distance to the object is further than the distance A, the shutter speed is set to the synchronizing speed (1/60). Then, upon pressing down of a shutter release button (not shown), the ratchet wheel 13 starts to rotate, causing the stop down of the aperture size through the linkage of lever 13' and the pin 2a. Thereafter, when the aperture size reaches the size calculated in the calculator Co by the use of information regarding the intrinsic guide number, the film sensitivity and the distance to the object, an electric current is supplied to the electromagnet Mg1 from the aperture control circuit CA to release the bell crank lever 21 apart from the permanent magnet 31, resulting in stoppage of rotation of the ratchet wheel 13 by the engagement of pawl of the bell crank lever 21 into the ratchet wheel 13. Thus, the aperture size is determined. The release of the bell crank lever 21 from the permanent magnet 31 also actuates on the focal plane shutter mechanism SH in such a manner that a portion (not shown) of the bell crank lever 21 releases the leading curtain control gear 11 from a locked condition to allow the scan of the leading curtain 18 across the frame 1c starting the opening action of the shutter mechanism. When the leading curtain 18 finishes the scan to fully open the shutter frame 1c, the pin 11a of the leading curtain control gear 11 closes the switch S1 to produce a signal for the start of the emitting of the instantaneous flash light. The signal produced from the discrimination circuit Cd is applied to the light emitting apparatus 3, which has been charged and is in a condition ready to emit the instantaneous flash light. At the start of rotation of the leading curtain control gear 11, a counter (not shown) for counting the shutter speed is actuated by any known means (not shown). When the counter counts the synchronizing speed, a signal produced from the shutter control circuit Cs is applied to the electromagnet Mg2 for releasing the lever 20 from the permanent magnet 30 resulting in disengagement of the pawl of the lever 20 from the pin 12a of the trailing curtain control gear 12. Accordingly, the trailing curtain 19 scans across the frame 1c and, at the same time, the switch S1 is opened by a known mechanism (not shown) to complete a single photographic operation.

On the other hand, when the distance to the object is closer than the distance A, the discrimination circuit Cd produces a signal that sets the flash light emitting apparatus to its prolonged flash light emitting mode. In this case, the shutter speed is set to a shutter speed determined by the selected program. For example, when the program I shown in FIG. 2 is selected, the shutter speed is set to 1/125 of a second for the target object located within the distance range A-B', and when the program II is selected, the shutter speed is set to 1/1000 of a second for the target object located within the distance range A-D. Then, by a signal from the discrimination circuit Cd, the calculation circuit Co is so actuated that it calculates the aperture size using the information regarding the determined shutter speed, the light intensity Io of the prolonged flash light, the distance to the target object, and the film sensitivity. The signal indicative of the calculated aperture size is applied to the aperture control circuit CA for actually setting the aperture to the calculated size. Since the flash light emitting apparatus is in its prolonged flash light emitting mode as set by the signal obtained from the discrimination circuit Cd, it starts to produce the prolonged flash light by the closure of the switch S2 effected in response to the start of turning of the leading curtain control gear 11, i.e., before the leading curtain 18 starts to open the frame 1c. Then, after a time interval corresponding to the shutter speed, an electric current is applied to the electromagnet Mg2 from the shutter speed control circuit Cs for allowing the scan of the trailing curtain 19 across the frame 1c, thus closing the same. When the program I is selected, since the aperture value is set to the minimum aperture value F22 for a target object located at the distance B, the calculation circuit Co sets the aperture value to its minimum and the program is so arranged as to vary the shutter speed for a target object located in the distance range B'-D. In other words, upon receipt of the signal indicative of minimum aperture value from the information setting circuit Cl, the calculation circuit Co calculates a proper shutter speed for an object located in the range B'-D by the use of information regarding the prolonged flash light intensity Io, the film sensitivity and the distance to the object. A signal indicative of the calculated shutter speed is applied to the shutter speed control circuit Cs for controlling the shutter mechanism in the above described manner.

When the program III is selected, an operation similar to that carried out in the program I for an object in the distance range B'-D is carried out for an object located in the distance range A-B'. In this case, however, the shutter speed is determined by the information regarding the aperture value set in the information setting circuit Cl, the prolonged light intensity Io, the film sensitivity and the distance to the object. Since the shutter speed reaches the fastest shutter speed at the distance B', the photographing of an object located in the distance range B'-D is programmed such that the shutter speed is fixed to the fastest shutter speed, i.e., 1/1000 of a second in the example of FIG. 2, and the aperture value is made variable. In other words, upon receipt of the signal indicative of the fastest shutter speed from the information setting circuit Cl, the calculation circuit Co calculates a proper aperture value using the information regarding the prolonged flash light intensity, the film sensitivity and the distance to the target object. A signal indicative of the calculated aperture value is applied to the aperture control circuit CA for controlling the aperture size in the above described manner.

Referring to FIG. 4, there is shown a circuit diagram for controlling a photographic operation based on the program I described above in connection with FIG. 2.

The variable resistor VR1 provided operatively in association with the distance setting ring has one end whicn is in common with the terminal J2' and is connected to ground. Similarly, the corresponding terminal J2 provided on the camera body 1 is grounded. The terminal J1 connected to the terminal J1' of the variable resistor VR1 is connected to a constant current source I1 for supplying a constant current to the variable resistor VR1. It is to be noted that the variable resistor VR1 is so arranged that a voltage produced across the terminals J1' and J2' corresponds to twice the logarithmic value of the distance L to the target object. Therefore, the electric potential $V_{J1}$ at the terminal J1 corresponds to $$2 \cdot \log_2 L = 2 \cdot L_v.$$

In FIG. 4, E3 designates a constant voltage source for producing a constant voltage $2 \cdot L_{vc}$ which corresponds to the distance A; AC1 designates a comparator for comparing voltages from the terminal J1 and from the constant voltage source E3; E1 designates a constant voltage source for producing a constant voltage corresponding to a value $2 \cdot G_v$-5; and E2 designates a constant voltage source for producing a constant voltage corresponding to a value $2 \cdot k$. An analogue switch AS1, which is shown in detail in FIG. 5a, receives signals from the constant voltage sources E1 and E2 and produces the signal of constant voltage source E1 when the output signal from the comparator AC1 is low and signal of constant voltage source E2 when the output signal from the comparator AC1 is high. A circuit enclosed by a dotted line and constituted by resistors R1 to R4 and an operational amplifier OA1 is a subtractor SU1, and the output of the subtractor SU1 is connected to a variable resistor VR2 and further to a constant current source I2.

An analogue switch AS2, which is shown in detail in FIG. 5b, has an input terminal J1 and two output terminals j2 and j3. When the analogue switch AS2 receives a high level signal from the comparator AC1, an N-channel field effect transistor FT3 provided in the analogue switch AS2 is turned on and P-channel field effect transistors FT2 and FT4 are turned off for producing the signal applied to the input terminal j1 from the output terminal j3. In this case, no signal is produced from the terminal j2. On the other hand, when the analogue switch AS2 receives a low level signal from the comparator AC1, the N-channel field effect transistor FT3 is turned off and P-channel field effect transistors FT2 and FT4 are turned on for producing the signal applied to the input terminal j1 from the terminal j2. In this case, the terminal j3 produces a ground level signal.

A constant voltage source E4 for producing a constant voltage corresponding to the fixed shutter speed $T_{vc2}$ (for example, 1/125 sec.) is connected to a subtractor SU2 constituted by resistors R5 to R8 and an operational amplifier OA2. E6 is a voltage source for producing a voltage corresponding to minimum aperture size (Avmax) and, by way of example, it produces a voltage corresponding to the position of signal element of the objective lens assembly 2. AS3 is an analogue switch having the same structure as the analogue switch AS1. The analogue switch AS3 produces the signal from the voltage source E6 when a comparator AC2 produces a low level signal, and produces the signal from the analogue switch AS2 or from the operational amplifier OA2 when the comparator AC2 produces a high level signal.

E7 is a voltage source for producing a voltage corresponding to the fully open aperture size, i.e., maximum aperture size (Avmin) and, by way of example, it produces a voltage corresponding to the position of the signal element of the objective lens assembly 2. LD1 is a light emitting diode provided for the indication, when it is lit, of the system being out of control due to the fact that the calculated aperture size is larger than the available maximum aperture size. CA is the aperture control circuit which calculates, for example, a signal indicative of necessary degree of stopping down of the aperture size by the use of aperture signal obtained from the analogue switch AS3 and the maximum aperture size signal obtained from the voltage source E7. Furthermore, in the aperture control circuit CA, the calculated signal therein is compared with the signal obtained from the signal transmitting element of the objective lens assembly, and when the latter signal matches with the former signal, the aperture control circuit CA produces a signal to operate the electromagnet Mg1 for setting the aperture to the calculated size.

E5 is a constant voltage source for producing a constant voltage corresponding to synchronizing shutter speed, such as 1/60 sec., when carrying out the photographic operation in its the instantaneous flash light mode. AS4 is an analogue switch having the same structure as the analogue switch AS1 and produces a voltage signal from constant voltage source E4 when the comparator AC1 supplies a high level signal to it; and produces a voltage signal from constant voltage source E5 when the comparator AC1 supplies a low level signal to it. Resistors R9 to R12 and an operational amplifier OA3 constitute a subtractor SU3. An analogue switch AS5 having the same structure as the analogue switch AS1 produces signal from analogue switch AS4 when the comparator AC2 supplies a high level signal to it, and produces signal from operational amplifier OA3 when the comparator AC2 supplies a low level signal to it.

LD2 is a light emitting diode provided for the indication, when it is lit, of the system being out of control due to the fact that the calculated shutter speed is faster than the available maximum shutter speed. Cs is the shutter control circuit for controlling the shutter speed to the speed corresponding to the output voltage of the analogue switch AS5. S1 is the switch that closes when the shutter is completely opened and is connected to a so-called synchro-terminal, and S2 is the switch that closes when the shutter starts to open. The light emitting apparatus 303 is set to the instantaneous light emitting mode when it receives a low level signal from the terminal J4, J4', and to the prolonged light emitting mode when it receives a high level signal from the terminal J4, J4'. The instantaneous flash light is emitted upon closure of the switch S1, and the prolonged flash light is emitted upon closure of the switch S2. A detail of the flash light emitting apparatus 303 is described later in connection with FIG. 6.

Next, the operation of the circuit of FIG. 4 is explained with reference to the program I of FIG. 2.

When the target object is located in the distance range C-A, the terminal J1 produces a voltage which is higher than that from the constant voltage source E3. Accordingly, in this case, the comparator AC1 produces a low level signal. Thus, the analogue switch AS1 produces a voltage from constant voltage source E1, which is indicative of the intrinsic guide number (2Gv−5). The voltage from the analogue switch AS1 is subtracted by the distance signal (2Lv) from the terminal J1 in the subtractor SU1. Thus, the subtractor SU1 produces a signal indicative of:

$$(2Gv-5-2Lv).$$

The signal from the subtractor SU1 is added to the signal indicative of the film sensitivity Sv as produced by the variable resistor VR2. Thus, the variable resistor VR2 produces a signal indicative of:

$$Av = 2(Gv-Lv)+(Sv-5). \qquad (5)$$

Since the comparator AC1 is now producing a low level signal, the analogue switch AS2 connects its input terminal j1 with its output terminal j2 to produce the signal corresponding to equation (5) from the output terminal j2 of the analogue switch AS2. In this case, since the terminal j3 of the analogue switch AS2 produces a ground level signal, the output from the subtractor SU2 has a negative voltage level. Also, since the comparator AC1 is producing a low level signal, the N-channel field effect transistor FT1 is set to its nonconductive state. Therefore, the signal from the output terminal j2 of the analogue switch AS2 is maintained to be equal to the signal obtained from the variable resistor VR2. Since the subtractor SU2 produces a negative voltage, the comparator AC2 produces a high level signal which is applied to the analogue switch AS3. Thus, the analogue switch AS3 is so actuated as to produce the signal from output terminal j2 of switch AS2 which is in turn applied to the aperture control circuit CA and also to the comparator AC3. When the signal corresponding to equation (5), as applied to the aperture control circuit CA, is not less than the voltage of the constant voltage source E7 producing the voltage signal corresponding to the maximum aperture size (Avmin), the comparator AC3 produces a high level signal to prevent the emission of light from the light emitting diode LD1 and, at the same time, the aperture control circuit CA is operated to set the aperture to the size according to equation (5). On the other hand, when the signal corresponding to equation (5) is less than the voltage of the constant voltage source E7, the comparator AC3 produces a low level signal to cause the emission of light from the light emitting diode LD1 for the indication of the system being out of control due to the fact that the calculated aperture size is beyond the available maximum aperture size and, at the same time, the aperture control circuit CA is operated to set the aperture size to the maximum aperture size.

Furthermore, since the comparator AC1 produces the low level signal and the comparator AC2 produces the high level signal, the analogue switch AS4 produces the signal from constant voltage source E5 and the analogue switch AS5 produces the output signal of analogue switch AS4. The output of the analogue switch AS5, which is the voltage from constant voltage source E5, is applied to the shutter control circuit Cs for the control of the shutter speed to the synchronizing shutter speed, i.e., 1/60 sec.

Moreover, since the comparator AC1 produces a low level signal, the light emitting apparatus 303 is set to the instantaneous flash light emitting mode and, at the same time, transistors Q1 and Q3 are set to their non-conductive state and the transistor Q2 is set to its conductive state. Accordingly, when the shutter is completely opened, the synchro-terminal (switch S1) is closed to produce the instantaneous flash light from the apparatus 303.

Next, the operation when the target object is located in the distance range A-B' is explained.

In this case, the terminal J1 produces a voltage which is lower than that from the constant voltage source E3. Accordingly, the comparator AC1 produces a high level signal. Upon receipt of the high level signal from the comparator AC1, the analogue switch AS1 produces the voltage signal from the constant voltage source E2, which is indicative of the constant 2k. The distance signal 2Lv from the terminal J1 is subtracted from the constant 2k by the subtractor SU1. Thus, the subtractor SU1 produces a signal indicative of:

$$2 \cdot (k - Lv).$$

Thereafter, this difference is added to a voltage signal from the variable resistor VR2 for producing the film sensitivity signal.

Since the comparator AC1 produces a high level signal, the analogue switch AS2 produces an output signal from its output terminal j3 which is equal to the signal applied to its terminal j1. The signal produced from the output terminal j3 of the analogue switch AS2 and the signal indicative of the fixed shutter speed Tvc2 (1/125 sec.) from the constant voltage source E4 are supplied to the subtractor SU2, which accordingly produces a signal indicative of:

$$Av = 2 \cdot (k - Lv) + Sv - Tvc2. \quad (8\text{-}1)$$

In this case, since the calculated aperture value Av is smaller than the minimum aperture value Avmax, the comparator AC2 produces a high level signal. Therefore, the analogue switch AS3 receives the calculated aperture signal corresponding to equation (8−1) through the N-channel field effect transistor FT1 and provides the same signal to the aperture control circuit CA and to the comparator AC3 for carrying out the aperture control in a manner similar to that described above. Furthermore, since the comparator AC1 produces a high level signal, the analogue switch AS4 produces the signal from constant voltage source E4, and since the comparator AC2 produces a high level signal, the analogue switch AS5 produces the signal that it received from the analogue switch AS4. Therefore, the shutter speed is controlled by the voltage from the constant voltage source E4 and, thus, is fixed at 1/125 sec. Moreover, since the output of the comparator AC1 is high, the light emitting apparatus 303 is set to its prolonged flash light emitting mode and, at the same time, the transistors Q1 and Q3 are set to be conductive and the transistor Q2 is set to non-conductive. Then, when the switch S2 closes at the start of the shutter opening, the light emitting apparatus 303 produces the prolonged flash light.

Next, the operation when the target object is located in the distance range B'-D is explained. In this case, the operation, which is the same as the previous operation up to the operation of the subtractor SU2, is carried out by applying a signal to the comparator AC2 which is indicative of the aperture value Av which is given by the equation (8-1). Since in this case, the signal indicative of the aperture value Av is greater than the signal indicative of the minimum aperture size Avmax obtained from the voltage source E6, the comparator AC2 produces a low level signal causing the analogue switch AS3 to produce a voltage signal from the voltage source E6. Accordingly, the aperture control circuit CA sets the aperture to the minimum aperture size.

Meanwhile, in the subtractor SU3, the signal indicative of the minimum aperture size Avmax from the voltage source E6 is subtracted from the signal obtained from the terminal j3 of the analogue switch AS2 for producing a signal from the operational amplifier OA3 which is indicative of the shutter speed Tv as given below:

$$Tv = 2 \cdot (k - Lv) + Sv - Avmax \quad (8\text{-}2)$$

In this case, since the comparator AC2 produces a low level signal, the analogue switch AS5 produces the signal obtained from the subtractor SU3, i.e., a signal indicative of shutter speed Tv of equation (8-2). Therefore, the shutter speed control circuit Cs controls the shutter speed by the signal indicative of equation (8-2). When the shutter speed calculated by the equation (8-2) is faster than the maximum available shutter speed Tvmax, the comparator AC4 produces a low level signal and, thus, the light emitting diode LD2 is lit for the indication of out of control due to the fact that the calculated shutter speed is faster than the available maximum shutter speed. In a manner similar to the previous operation, the light emitting apparatus produces the prolonged flash light in response to the opening of the shutter.

Figure 6:
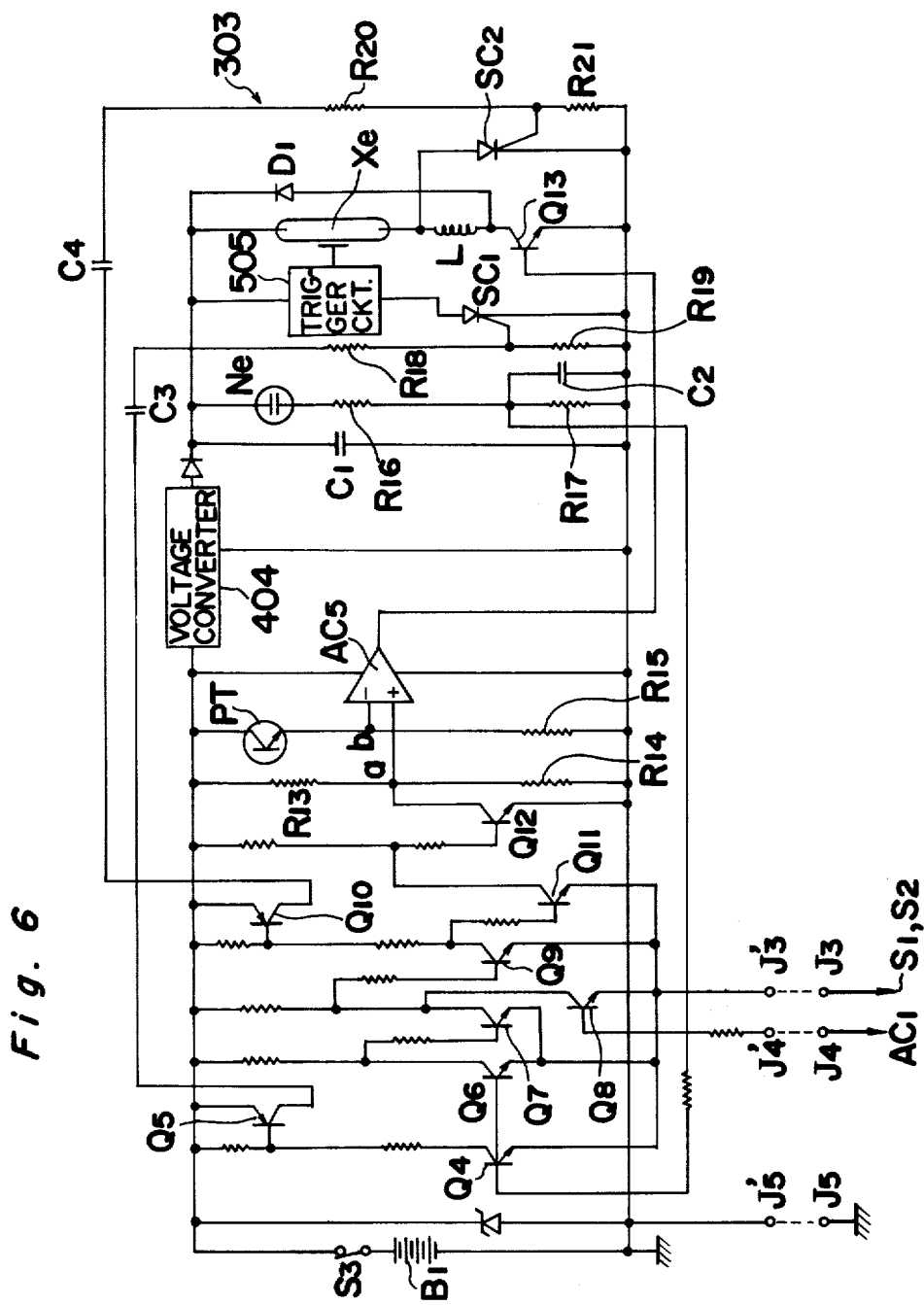
FIG. 6 is a circuit diagram of a light emitting apparatus employed in the photographic apparatus of FIG. 3.

Referring to FIG. 6, there is shown a circuit diagram of the light emitting apparatus 303. The circuit comprises a battery B1 used as a source of electric power, a main switch S3, a voltage converter 404, a main capacitor C1, a neon-tube Ne which is actuated to produce light when the main capacitor C1 is charged to a predetermined level, a xenon tube Xe, and a trigger circuit 505 for triggering the xenon tube Xe.

When the main switch S3 is closed, the voltage converter 404 actuates to start charging the main capacitor C1. When the main capacitor C1 is charged to a predetermined voltage, the neon tube Ne is actuated to produce light and, at the same time, a junction between resistors R16 and R17 reaches a high level which causes transistors Q4 and Q6 to conduct. When the terminal J'4 is receiving a low level signal, the terminal J'3 receives a low, or ground, level signal upon closure of the switch S1 (synchro-terminal). Thereupon, the transistors Q4 and Q5 conduct to produce a high level signal from a junction between resistors R18 and R19. Accordingly, a thyristor SC1 conducts to actuate the trigger circuit 505 and, thus, the trigger circuit 505 triggers the xenon tube Xe. Since transistor Q8 is maintained in a non-conductive state by the low level signal from the terminal J'4, transistors Q6, Q9 and Q10 conduct and transistor Q7 remains non-conductive in response to the closure of the switch S1. Therefore, a junction between resistors R20 and R21 produces a high level signal for conducting the thyristor SC2 and, thus, the xenon tube Xe starts to produce the instantaneous flash light as shown by the waveform W1 of FIG. 1a. In this case, by the conduction of the transistor Q9, the transistor Q11 is turned to its non-conductive state and the transistor Q12 is maintained in its conductive state. Therefore, a comparator AC5 continues to produce a low level signal for preventing the conduction of the transistor Q13.

On the other hand, when the terminal J'4 receives a high level signal, the terminal J'3 receives a low level signal from the switch S2 at the very beginning of the opening of the shutter by the closure of the switch S2. By the closure of the switch S2, transistors Q4 and Q5 and thyristor SC1 are caused to conduct so as to trigger the xenon tube Xe. Furthermore, since the transistor Q11 conducts in response to the closure of the switch S2, the transistor Q12 is held in its non-conductive state. Therefore, the comparator AC5 produces a high level signal for causing the conduction of the transistor Q13, thus allowing the emission of light from the xenon tube by the current flow from the xenon tube through the coil L and the transistor Q13. Because of the coil L, the current flowing through the xenon tube Xe lags so as to prevent the xenon tube Xe from producing an instantaneous flash light and, at the same time, the electromagnetic energy is accumulated in the coil L. When the light intensity from the xenon tube Xe reaches and exceeds the predetermined level Io, a phototransistor PT, provided for monitoring the flash light from the xenon tube Xe, is actuated to allow a predetermined current flow through a resistor R15 resulting in the increase of voltage at a junction b. When the voltage at the junction b exceeds the voltage at a junction a between the resistors R13 and R14, the comparator AC5 produces a low level signal for turning the transistor Q13 to its non-conductive state. Thereupon, the energy charged in the coil L is discharged through diode D1 and xenon tube Xe for effecting again the emission of light from the xenon tube Xe. When the coil L dissipates its energy, the light intensity of the light from the xenon tube Xe gradually drops so as to gradually decrease the current flow through the phototransistor PT, resulting in a voltage drop at the junction b. When the voltage at the junction b drops below the voltage at the junction a, the comparator AC5 produces a high level signal to cause the conduction of the transistor Q13, resulting in a current flow through the xenon tube Xe and the coil L. Thus, the xenon tube Xe again produces the light and electromagnetic energy is accumulated in the coil L. Thereafter, a similar operation is carried out repeatedly to continuously emit light from the xenon tube Xe, resulting in the emission of the prolonged flash light from the xenon tube Xe as shown by the waveform W2 of FIG. 1a.

It is to be noted that a capacitor C2 is provided for maintaining the transistors Q4 and Q6 in their conductive state during the emission of a prolonged flash light from the xenon tube Xe, regardless of a change of the neon tube Ne to its non-conductive state due to the dropping of the charged voltage in the main capacitor C1. Furthermore, capacitors C3 and C4 are provided for applying a trigger pulse to the gates of the thyristors SC1 and SC2.

Figure 7:
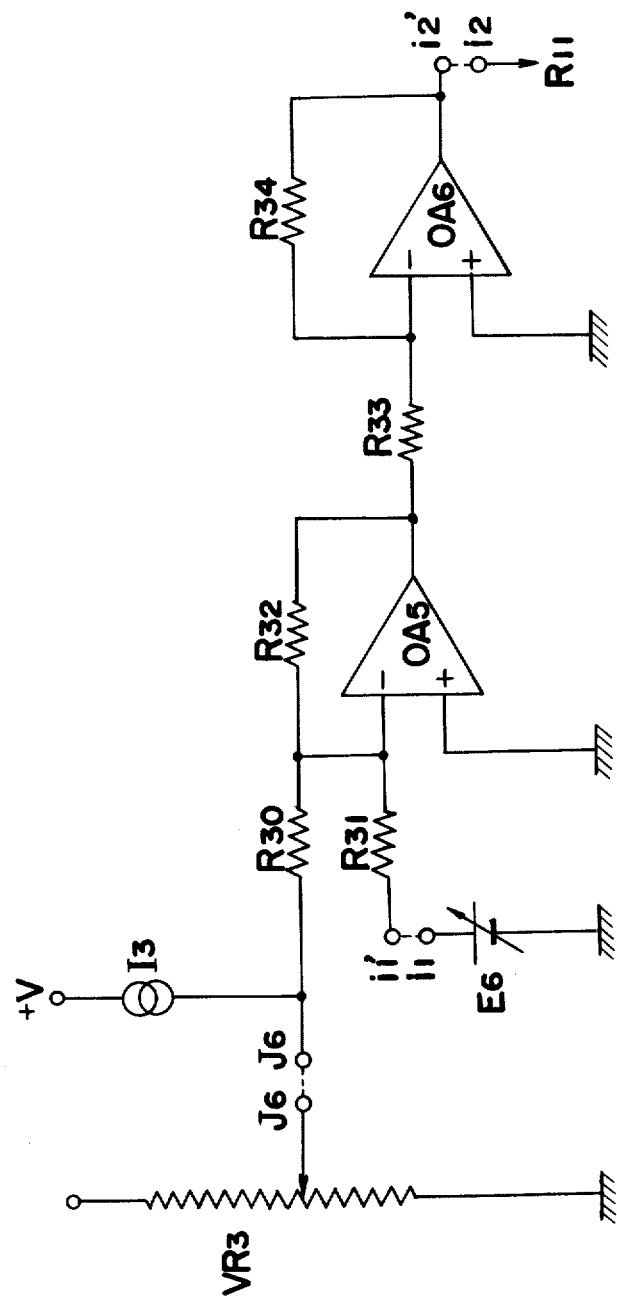
FIG. 7 is a circuit diagram of a correction circuit which is to be adopted in the circuit of FIG. 4.

Referring to FIG. 7, there is shown a circuit diagram of a correction circuit for correcting the exposure, particularly for the target objects located near the camera. This correction circuit is incorporated in the circuit of FIG. 4 in such a manner that, instead of the shortcircuiting lead line, terminals i1 and i2 of the circuit of FIG. 4 are connected with terminals i'1 and i'2 of the correction circuit. When the circuit of FIG. 7 is employed, the subtractor SU3 receives a signal indicative of the lower limit aperture value of the effective aperture value range, instead of the minimum aperture value Avmax.

The correction circuit comprises a variable resistor VR3 provided in association with a distance setting ring 2b of the objective lens assembly for producing a signal corresponding to the distance to the target object. More particularly, it produces a signal indicative of logarithm of $(1+M/\psi)^2$, wherein M is a magnification of the image and can be expressed as $M=f/(d-f)$, f being a focal length and d being a distance to the target object, and $\psi$ is the pupil magnification coefficient. J'6 and J6 are terminals provided on the objective lens assembly 2 and the camera body 1, respectively, for applying a constant current produced from a constant current source I3 to the variable resistor VR3. Accordingly, the voltage which is produced from the variable resistor VR3 and is applied to the terminal J6 can be expressed as:

$$\log_2(1+M/\psi)^2.$$

Resistors R30, R31 and R32 and operational amplifier OA5 constitutes an adder which receives the voltages from the terminals J6 and i'1 and produces a voltage signal:

$$-[Avmax+\log_2(1+M/\psi)^2].$$

The voltage signal is applied to an inverting amplifier constituted by resistors R33 and R34 and an operational amplifier OA6. Therefore, the terminal i'2 produces a voltage signal:

$$Avmax+\log_2(1+M/\psi)^2$$

which is applied to the subtractor SU3 for calculating the exposure time based on the lower limit aperture value of the effective aperture value range.

Figure 8:
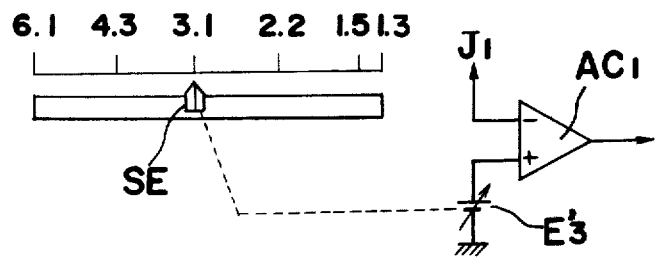
FIG. 8 is a schematic illustration of one arrangement of a variable voltage source employed as a standard which can be changed in accordance with flash modes.

According to the circuit of FIG. 4, the reference voltage applied to the comparator AC1 is fixed to a predetermined voltage by the employment of a constant voltage source E3 for setting a fixed distance for the changeover of the flash light mode between the instantaneous flash light mode and the prolonged flash light mode. By replacing the constant voltage source E3, however, with a variable voltage source E3', as shown in FIG. 8, it is possible to change the distance at which the flash light mode changes. In this case, it is preferable to provide a manually shiftable needle SE which is provided in association with the variable voltage source E3' and shifts along a scale marked with distance. In operation, when the variable voltage source E3' is set to a distance corresponding to A' in FIG. 2, the instantaneous flash light is produced for the target object located in the distance range C-A'. In the distance range A'-B', the prolonged flash light is produced with a fixed shutter speed of 1/125 and variable aperture size, and in the distance range B'-D, the prolonged flash light is produced with a variable shutter speed and fixed aperture size to its minimum. By changing the voltage of the voltage source E3', it is possible to set the changeover point of flash light mode anywhere between the points A' and B.

When it is desired to carry out the photographing according to the program II (single chain line) of FIG. 2, all it is necessary to do is to set the constant voltage source E4 to a voltage corresponding to a shutter speed of 1/1000 a second. When this is done, the subtractor SU2 calculates the aperture value for the shutter speed of 1/1000 of a second and the shutter speed control circuit Cs sets the shutter speed to 1/1000 of a second for the target object in the distance region A-D.

In view of this, it is possible to replace the constant voltage source E4 with a variable voltage source E4' that can produce a voltage varying from a voltage corresponding to a shutter speed of 1/1000 of a second to a voltage corresponding to a shutter speed of 1/125 of a second so as to allow the selection of a shutter speed between 1/1000 and 1/125 of a second during the prolonged flash light mode in the program II. For example, when the voltage source E4' is set to a voltage corresponding to a shutter speed of 1/500 of a second, the photographic operation for the target object in the distance region C-A is carried out by the instantaneous flash light. In the distance region A-B'', it is carried out by the prolonged flash light with a fixed shutter speed of 1/500 of a second and a variable aperture size based on the calculated value in the subtractor SU2, and in the distance region B''-D, it is carried out by the prolonged flash light with a variable shutter speed based on the calculated value in the subtractor SU3 and a fixed aperture size which is equal to its minimum size.

In consideration of the above, it is possible to arrange the circuit of FIG. 4 so as to be capable of selectively setting the changeover point of the flash light mode and, at the same time, selectively setting the shutter speed for the prolonged flash light. In this case, it is preferable to employ the circuit arrangement of FIG. 8 together with FIG. 9 in the circuit of FIG. 4 because of the following reason. When the changeover point of the flash light mode is set at a point between the points A and B, the photographic operation is carried out in a manner similar to that described above with reference to FIG. 4 with shutter speed being set to 1/125 sec. When the changeover point of the flash light mode is set at a point between points A' and A, however, it is necessary to first determine whether or not the signal produced from the subtractor SU2 and indicative of aperture value Av is smaller than the aperture value Avmin corresponding to the maximum aperture size. When Av<Avmin, the aperture control circuit CA should preferably receive the aperture value Avmin, and the subtractor SU3 should preferably calculate:

$$Tv = 2 \cdot (k - Lv) + Sv - Avmin \qquad (8\text{-}3)$$

for the control of the shutter speed. On the other hand, when Avmax≧Av≧Avmin, the aperture size should be controlled by the calculated aperture value Av from the subtractor SU2, and the shutter speed should be controlled by the variable voltage source E'4. And, when Av>Avmax, the aperture should be set by the aperture value Avmax which is indicative of the minimum aperture size, and the subtractor SU3 should calculate:

$$Tv = 2 \cdot (k - Lv) + Avmax \qquad (8\text{-}2)$$

for the control of the shutter speed, in the same manner as that carried out in the circuit of FIG. 4.

Figure 9:
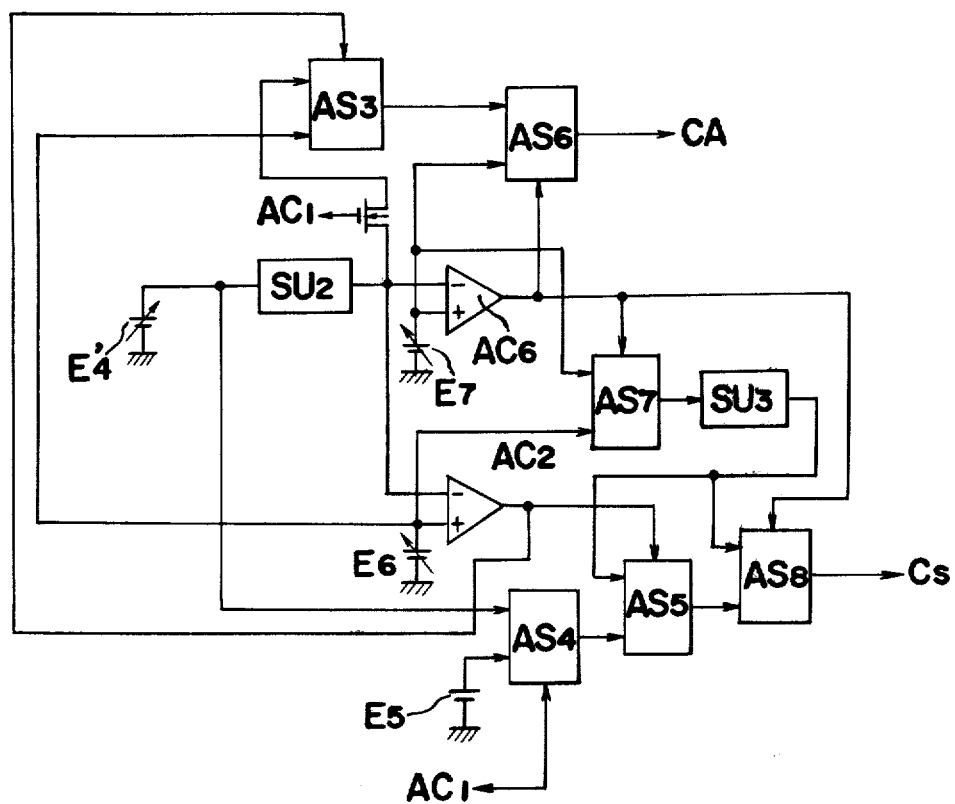
FIG. 9 is a circuit diagram showing a modified form of a portion of the circuit of FIG. 4.

FIG. 9 shows a circuit which is to be employed in the circuit of FIG. 4 so as to meet the above-noted requirement. The operation of circuit of FIG. 9 is described below.

When the subtractor SU2 produces a signal indicative of an aperture value Av which is smaller than the aperture value Avmin (Av<Avmin), a comparator AC6 produces a high level signal for effecting an analogue switch AS6 to produce a signal from voltage source E7 for producing the aperture signal Avmin corresponding to the maximum aperture size. Thus, the signal indicative of Avmin, produced by the analogue switch AS6, is applied to the aperture control circuit CA. In a similar manner, an analogue switch AS7 produces the signal indicative of Avmin which is applied to the subtractor SU3 for obtaining the signal indicative of the shutter speed Tv given by the equation (8-3). The signal of the shutter speed Tv, produced by the subtractor SU3, is applied through an analogue switch AS8 to the shutter control circuit Cs for the control of the shutter speed.

When the signal corresponding to the aperture value Av, produced by the subtractor SU2, is between Avmax and Avmin, (Avmax≧Av≧Avmin), the comparator AC6 produces a low level signal and the comparator AC2 produces a high level signal. Accordingly, the aperture control circuit CA receives the signal corresponding to the aperture value Av from the subtractor SU2 through analogue switches AS3 and AS6, and the shutter control circuit Cs receives the signal corresponding to the fixed shutter speed Tv from the variable voltage source E4' through the analogue switches AS4, AS5 and AS8. In this case, although the analogue switch AS7 is producing the signal corresponding to the Avmax obtained from the variable voltage source E6, no influence is effected on the shutter speed control by the signal obtained from the subtractor SU3.

When the signal corresponding to the aperture value Av, produced by the subtractor SU2, is greater than the aperture value Av, (Av>Avmax), the signal indicative of the aperture value Avmax, produced by the variable voltage source E6, is applied to the aperture control circuit CA through the analogue switches AS3 and AS6, and the calculated signal as is given by the equation (8-2) and is produced by the subtractor SU3 and applied to the shutter control circuit Cs through analogue switches AS5 and AS8.

Figure 10:
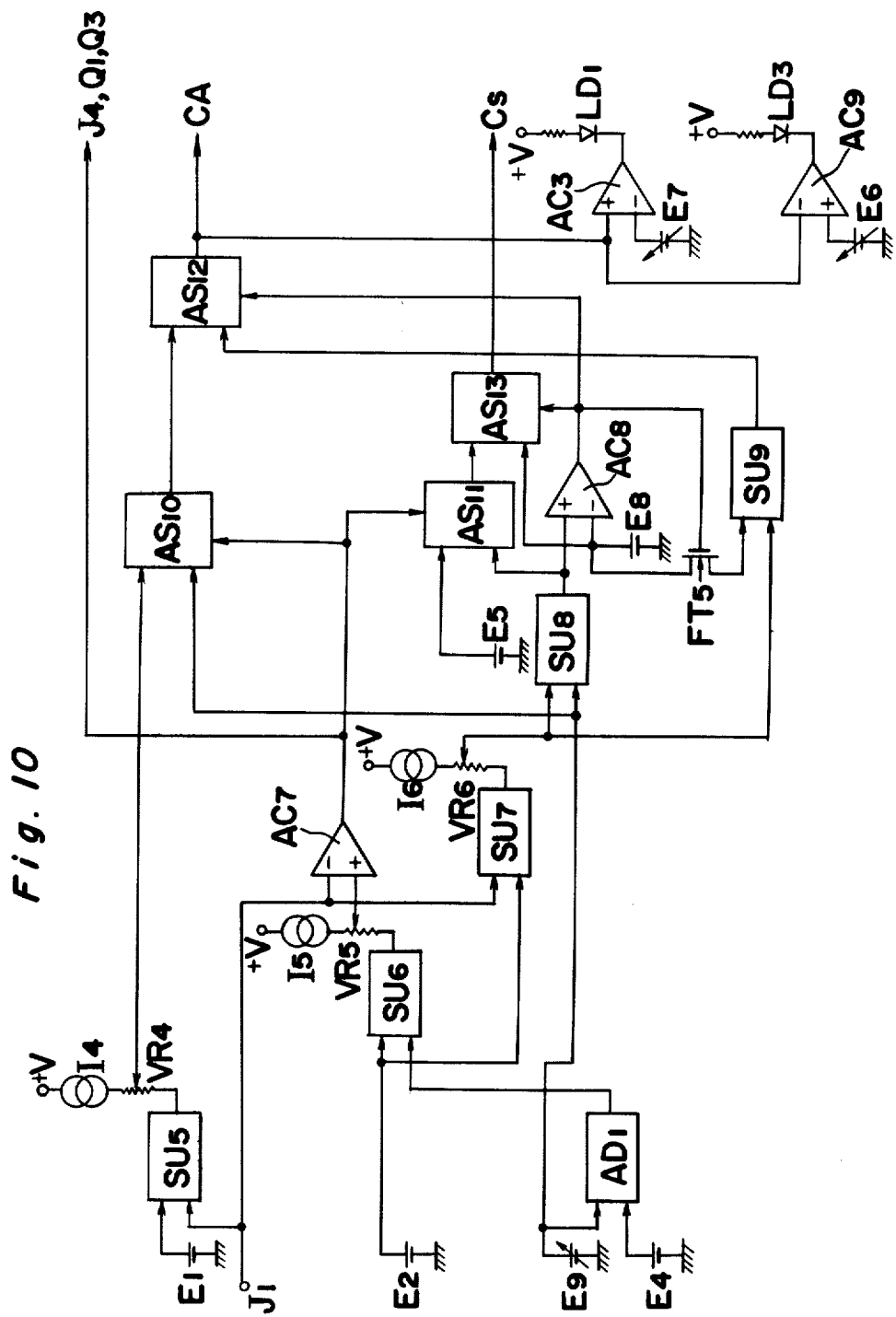
FIG. 10 is a circuit diagram showing a modification of circuit of FIG. 4.

Referring to FIG. 10, there is shown a modification of the circuit of FIG. 4. In FIG. 10, parts which are identical to those in FIG. 4 are designated by the same reference characters. According to this modification, the aperture size is arranged so as to be manually set prior to the automatic setting of the shutter speed, and a variable voltage source E9 is provided for producing a signal indicative of the aperture value Avs obtained by the manual setting. Each of the variable resistors VR4, VR5 and VR6 is provided for setting the film sensitivity, and they all operate simultaneously so as to produce the same voltage.

An adder AD1 adds the signal indicative of the set aperture value Avs obtained from the variable voltage source E9 and a signal indicative of the fixed shutter speed Tvc2 (corresponding to, for example, a shutter speed of 1/125 of a second) obtained from the constant voltage source E4 for producing a signal indicative of the sum of (Avs+Tvc2). Then, in a subtractor SU6, the sum is subtracted from the constant 2k to obtain:

$$2 \cdot k - (Avs + Tvc2).$$

Therefore, the variable resistor VR5 produces a voltage signal of:

$$2 \cdot Lvs = 2k + Sv - (Avs + Tvc2) \qquad (8\text{-}4)$$

which is compared in a comparator AC7 with the signal indicative of the distance 2Lv for determining the mode of flash light. When 2Lvs<2Lv, the comparator AC7 produces a low level signal for the indication of the instantaneous flash light mode and, when 2Lvs≧2Lv, the comparator AC7 produces a high level signal for the indication of the prolonged flash light mode.

When the comparator AC7 produces the low level signal (instantaneous flash light mode), a subtractor SU5 subtracts a signal indicative of the distance 2Lv to the target object, obtained from the terminal J1, from a signal indicative of the intrinsic guide number 2Gv-5 of the flash light emitting apparatus, obtained from the constant voltage source E1. Thus, the variable resistor VR4 produces a voltage signal:

$$Av = 2 \cdot (Gv - Lv) + (Sv - 5). \quad (5)$$

Since each of the comparators AC7 and AC8 produces a low level signal, the signal corresponding to Av, produced by the variable resistor VR4, is applied through analogue switches AS10 and AS12 to the aperture control circuit CA, and is also applied to the comparator AC3. In the comparator AC3, the signal of Av from the analogue switch AS12 is compared with signal indicative of the aperture value Avmin, corresponding to the maximum aperture size, and produces a low level signal when Av<Avmin for emitting light from the light emitting diode LD1 for the indication of an out of control state of the system due to the fact that the calculated aperture size is above the available maximum aperture size. As to the shutter speed, a signal indicative of the synchronizing shutter speed Tvc1, obtained from the constant voltage source E5, is applied through the analogue switches AS11 and AS13, since the comparators AC7 and AC8 are producing a low level signal, to the shutter speed control circuit Cs.

On the other hand, when the comparator AC7 produces a high level signal (prolonged flash light mode), the subtractor SU7 produces a signal indicative of 2·(k−Lv) and thus, the variable resistor VR6 produces a signal indicative of 2·(k−Lv)+Sv. Accordingly, the subtractor SU8 produces a signal indicative of:

$$Tv = 2 \cdot (k - Lv) + Sv - Avs \quad (8-5)$$

which is compared with a signal indicative of the fastest shutter speed Tvmax, obtained from the constant voltage source E8 in the comparator AC8.

When Tv≦Tvmax, the comparator AC8 produces a low level signal which is applied to the analogue switch AS12 for transmitting the signal produced from the analogue switch AS10. Since the comparator AC7 is producing a high level signal, the analogue switch AS10 produces the signal, obtained from the variable voltage source E9, producing the signal corresponding to the manual set aperture value Avs. Accordingly, the aperture control circuit CA controls the aperture using the signal corresponding to the manual set aperture value Avs. As to the shutter speed, the shutter speed control circuit Cs receives a signal corresponding to the shutter speed Tv from the subtractor SU8 through the analogue switches AS11 and AS13.

When the result of the comparison in the comparator AC8 is a determination that Tv>Tvmax, the comparator AC8 produces a high level signal which causes a field effect transistor FT5 to conduct. Accordingly, a subtractor SU9 receives a signal indicative of the fastest shutter speed Tvmax from the constant voltage source E8, and produces a signal indicative of the $$Av = 2 \cdot (k - Lv) + Sv - Tvmax \quad (8-6)$$

which is applied through the analogue switch AS12 to the aperture control circuit CA for the control of aperture size and is also applied to a comparator AC9. In the comparator AC9, the signal corresponding to the aperture value Av is compared with a signal corresponding to an aperture value Avmax corresponding to the minimum aperture size. When Av>Avmax, the comparator AC9 produces a low level signal for effecting the emission of light from the light emitting diode LD3 indicating that the calculated aperture size is smaller than the available minimum aperture size. As to the shutter speed, since the comparator AC8 is producing high level signal, the analogue switch AS13 transfers a signal corresponding to the fastest shutter speed Tvmax from the constant voltage source E8 to the shutter speed control circuit Cs for enabling the control of the shutter speed.

According to the present invention, it is possible to modify the circuit of FIG. 4 in various arrangements. For example, in the circuit of FIG. 10, which is the modification of circuit of FIG. 4, the variable voltage source E9 can be replaced by a constant voltage source for producing a permanently fixed aperture value signal Avc and, at the same time, the constant voltage source E4 can be replaced by a variable voltage source for manually setting a desired shutter speed. When these replacements are effected, the variable resistor VR5 produces a voltage signal:

$$2 \cdot Lvs = 2k + Sv - (Avc + Tvs) \quad (8-7)$$

which is compared in the comparator AC7 with the signal indicative of the distance 2Lv for determining the mode of the flash light. When the mode is determined to be the prolonged flash light mode, and when Av<Avmax, the aperture size is controlled by a calculated signal indicative of the aperture value Av and given by:

$$Av = 2 \cdot (k - Lv) + Sv - Tvs, \quad (8-8)$$

and the shutter speed is controlled by the fixed signal corresponding to Tvs. When Av>Avmax, the aperture size is controlled by the fixed signal corresponding to Avmax and the shutter speed is controlled by the signal:

$$Tv = 2 \cdot (k - Lv) + Sv - Avmax. \quad (8-2)$$

Accordingly, the photographic operation according to the program III can be carried out in such a manner that, for the target objects located in the distance region C-A, the operation proceeds in the same manner as that of FIG. 10 with the flash light emitting apparatus being set in the instantaneous flash light mode. For the target objects located in the distance region A-B', the aperture size is controlled by a signal corresponding to the aperture value Avc (F/stop 8) and the shutter speed is controlled by a signal corresponding to the shutter speed Tv and expressed by:

$$Tv = 2 \cdot (k - Lv) + Sv - Avc. \quad (8-9)$$

When the shutter speed Tv of the equation (8-9) is greater than Tvmax (Tv>Tvmax), as occurred in the distance region B-D, the aperture size is controlled by a signal corresponding to the aperture value Av and given by:

$$Av = 2 \cdot (k - Lv) + Sv - Tvmax \quad (8-6)$$

and the shutter speed is controlled by a signal corresponding to the shutter speed Tvmax, corresponding to the fastest shutter speed.

In program III, it is possible to arrange the change-over point of the flash light mode so as to be variable and to selectively set the aperture to the desired size. Furthermore, it is possible to include all the programs explained above in one photographic apparatus for allowing the user to select his desired program.

According to the embodiment described above, although it has been explained that the distance to the target object has been obtained from the objective lens assembly 2, more particularly from the distance setting ring 2b, it can be obtained from any known distance detecting device. Furthermore, instead of the switch S2, it is possible to employ a switch that effects the start of counting the shutter speed, or a switch provided operatively in association with FP-terminal, for the start of emission of the prolonged flash light. Or, for the same purpose, it is possible to use a signal from a counter, which is provided for counting a time duration between a signal obtained from a count starting switch or FP-terminal and the moment when the exposure on the film surface starts. Or, for the same purpose, it is possible to use a signal indicative of the completion of counting of a counter which is provided for counting a predetermined period of time after the shutter release of the camera.

Although in the embodiment described above, the control operation is carried out by analogue signals, it can be carried out by digital signals.

Furthermore, in the above embodiment, it is possible to reduce the voltage at the non-inverting input of the comparator AC5 of FIG. 4 relative to the distance signal, when the target object is located closer than the diatance D, for broadening the range of distance available to take a photograph with the prolonged flash light.

Figure 11:
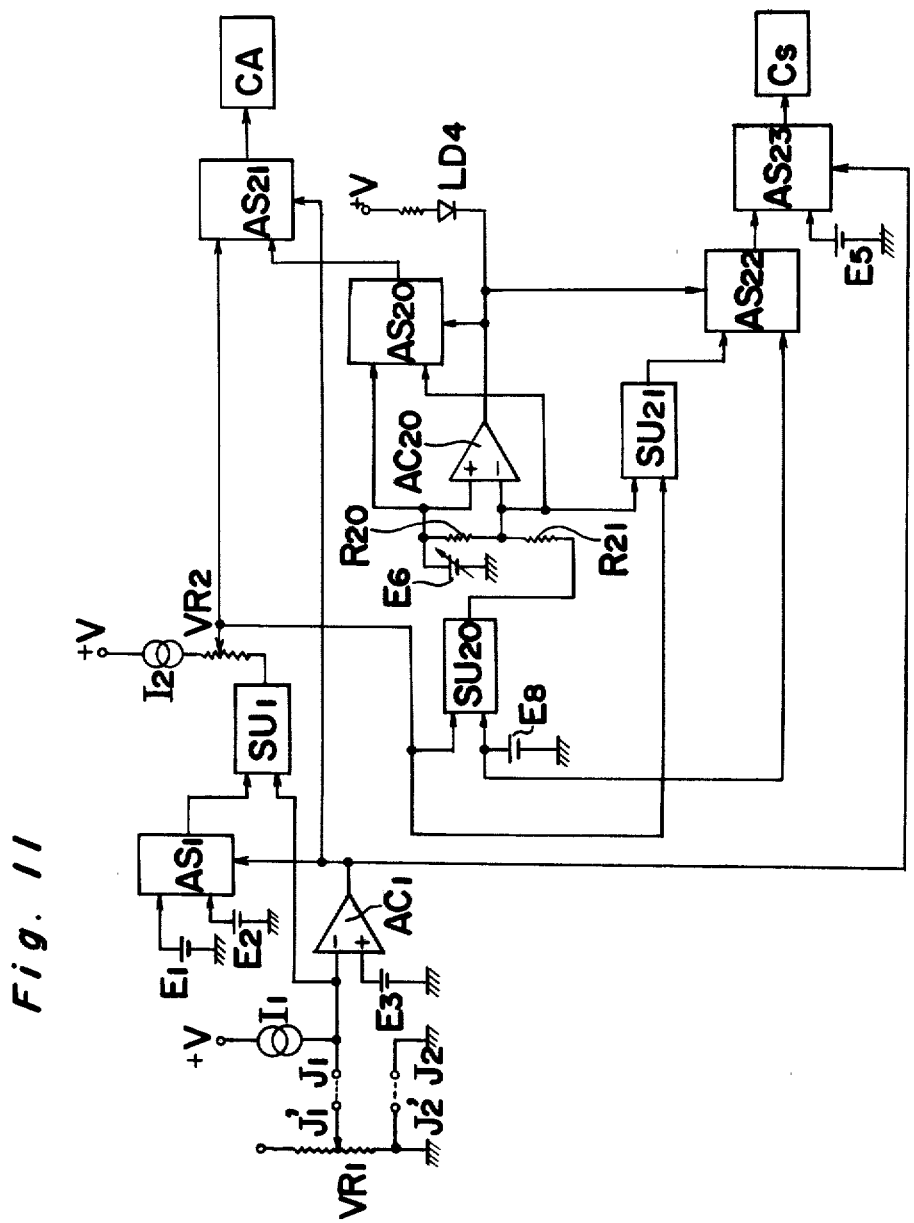
FIG. 11 is a circuit diagram of showing another modification of circuit of FIG. 4.

Referring to FIG. 11, there is shown a circuit which carries out photographing operation according to program IV shown by a double chain line in FIG. 2.

The structure and operation of circuit of FIG. 11 is described below. In FIG. 11, parts which are identical to those in FIG. 4 are designated by the same reference characters. In a manner similar to that described above in connection with FIG. 4, the comparator AC1 produces a high level signal when a distance signal obtained from the terminal J1 indicates that the target object is located further away from the point A. The high level signal from the comparator AC1 is applied to an analogue switch AS21 for allowing the analogue switch AS21 to produce a signal obtained from the variable resistor VR2 and indicative of the aperture value Av which is given by:

$$Av = 2 \cdot (Gv - Lv) + (Sv - 5).$$

This aperture signal Av is applied to the aperture control circuit CA for the control of the aperture size. As to the shutter speed, analogue switch AS23 produces a signal corresponding to the shutter speed Tvc1 (1/60 sec.), obtained from the constant voltage source, and transfers same to the shutter control circuit Cs for the control of the shutter speed. In this case, the flash light emitting apparatus produces the instantaneous flash light.

When the distance signal obtained from the terminal J1 indicates that the target object is located closer than the point A, the comparator AC1 produces a low level signal; thus, the variable resistor produces a signal:

$$2 \cdot (k - Lv) + Sv$$

which has its value reduced in a subtractor SU20 by a signal corrresponding to the fastest shutter speed Tvmax (1/1000 sec.), obtained from the constant voltage source E8. Accordingly, the subtractor SU20 produces a signal:

$$Ava = 2 \cdot (k - Lv) + Sv - Tvmax$$

which determines the aperture size for the target object in the distance range A-D in program II. Since the variable voltage source E6 produces a signal corresponding to the aperture value Avmax and corresponding to the minimum aperture size, and resistors R20 and R21 are fixed so as to have the same resistance, the junction between the resistors R20 and R21 produces a voltage signal corresponding to the aperture value Avp and which can be expressed as:

$$Avp = (Ava + Avmax)/2.$$

This determines the aperture size for the target object in the distance range A-D in program IV. As to the shutter speed, a subtractor SU21 subtracts the signal corresponding to the aperture value Avp from a signal corresponding to $2 \cdot (k - Lv) + Sv$, produced from the variable resistor VR2, for producing a signal corresponding to the shutter speed value Tvp and which can be expressed as:

$$Tvp = 2 \cdot (k - Lv) + Sv - Avp.$$

This Tvp determines the shutter speed for the target object in the distance range A-D in program IV.

A comparator AC20 is provided for comparing the signal corresponding to the aperture value Avp and obtained from the junction between the resistors R20 and R21 and the signal corresponding to the aperture value Avmax (corresponding to the minimum aperture size), obtained from the variable voltage source E6. When Avp≦Avmax, the comparator AC20 produces a high level signal, causing the analogue switch AS20 to produce the signal corresponding to the aperture value Avp, and causing the analogue switch AS22 to produce the signal corresponding to the shutter speed Tvp. Since the comparator AC1 is producing a low level signal, the analogue switch AS21 transmits the signal corresponding to the aperture value Avp from the analogue switch AS20 to the aperture control circuit CA and, at the same time, the analogue switch AS23 transmits the signal corresponding to the shutter speed Tvp from the analogue switch AS22 to the shutter control circuit Cs. In this case, the flash light emitting apparatus produces the prolonged flash light.

On the contrary, when Avp>Avmax, the comparator AC20 produces a low level signal, causing the analogue switch AS20 to produce the signal corresponding to the aperture value Avmax and obtained from the variable voltage source E6, and causing the analogue switch AS22 to produce the signal corresponding to the shutter speed Tvmax (the fastest shutter speed) from the constant voltage source E8. These signals corresponding to the aperture value Avmax and the shutter speed Tvmax are applied to the aperture control circuit CA and shutter control circuit Cs, respectively, in the same manner described above for the control of the aperture size and shutter speed. In this case, the flash light emitting apparatus produces the prolonged flash light and, the light emitting diode LD4 is lit for the indication that the target object is located closer than the lower limit of the available distance range for the photographic operation with the prolonged flash light under the above described condition.

It is to be noted that the photographic apparatus in FIG. 11 can be modified in various manners. For example, the ratio of resistance between the resistances R20 and R21 can be arranged so as to be a ratio other than 1:1. Furthermore, the program IV, which is shown in FIG. 2 to follow a straight line with a single slope, can be so arranged so as to follow a bent line with two different slopes. In this case, the break point of the line can be at the distance point B'. Moreover, it is possible to exchange the variable voltage source E6 and constant voltage source E8 so as to cause the subtractor SU20 to produce a signal corrresponding to the shutter speed and expressed as:

$$Twa = 2 \cdot (k - Lv) + Sv - Avmax$$

and to cause the junction between the resistors R20 and R21 to produce a signal corresponding to the shutter speed expressed as:

$$Tvp = (Tvmax - Twa)/2.$$

Although the present invention has been fully described by way of examples with reference to the accompanying drawings, it is to be noted that various changes and modifications are apparent to those skilled in the art. Therefore, unless such changes and modifications depart from the true scope of the present invention, they should be construed as included therein.

What is claimed is:

1. An exposure system for a camera comprising:
means for projecting an artificial light towards an object, said projecting means being capable of selectively projecting a first type of light which flashes instantaneously with a predetermined light quantity and a second type of light which flashes a prolonged period of time with a predetermined constant light intensity; and
means for selecting said first type of light when a distance to the object is greater than a standard, and for selecting said second type of light when the distance to the object is less than the standard.

2. An exposure system as claimed in claim 1, wherein said standard is variable.

3. An exposure system as claimed in claim 1, further comprising a focal plane shutter with a leading curtain and a trailing curtain, and timing means for initiating the projection of the artificial light at the end of the travel of said leading curtain in the case of said first type of light, and at the beginning of the travel of said leading curtain in the case of said second type of light.

4. An exposure system as claimed in claim 1, further comprising means for obtaining an information of distance to the object, means for setting an information of film speed and means for controlling the exposure in response to the predetermined intensity of the artificial light, the information of distance to the object, and the information of film speed, when said second type of light is selected.

5. An exposure system as claimed in claim 4, further comprising means for controlling the aperture size in response to the predetermined quantity of said artificial light, the information of distance to the object, and the information of film speed, when said first type of light is selected.

6. An exposure system as claimed in claim 4, wherein said exposure controlling means includes means for changing the aperture size in response to the change in the information of distance to the object with the exposure time being fixed to a predetermined time.

7. An exposure system as claimed in claim 4, wherein said exposure controlling means includes means for changing the exposure time in response to the change in the information of distance to the object with the aperture being fixed to a predetermined size.

8. An exposure system as claimed in claim 4, wherein said exposure controlling means includes means for changing both the exposure time and the aperture size in response to the change in the information of distance to the object in a predetermined manner.

9. An exposure system as claimed in claim 4, wherein said exposure controlling means includes means for calculating an effective aperture size relatively to the magnification of the image of the object.

10. An exposure system for a camera comprising:
electronic flash means for projecting an artificial light which flashes for a prolonged period of time and has a predetermined constant light intensity;
means for obtaining an information of distance to the object;
means for setting an information of film speed; and
means for controlling the exposure of the film in response to the predetermined intensity of said prolonged flash light, the information of distance to the object and the information of film speed.

11. An exposure system as claimed in claim 10, wherein said exposure controlling means includes means for changing the aperture size in response to the change in the information of distance to the object with the exposure time being fixed to a predetermined time.

12. An exposure system as claimed in claim 10, wherein said exposure controlling means includes means for changing the exposure time in response to the change in the information of distance to the object with the aperture being fixed to a predetermined size.

13. An exposure system as claimed in claim 10, wherein said exposure controlling means includes means for changing both the exposure time and the aperture size in response to the change in the information of distance to the object in a predetermined manner.

14. An exposure system for a camera comprising:
means for projecting an artificial light of a prolonged flash light which continues to project its flash light during a predetermined period of time and has a predetermined light intensity;
means for obtaining an information of distance to the object;
means for setting an information of film speed; and
means for controlling the exposure of the film in response to the predetermined intensity of said prolonged flash light, the information of distance to the object and the information of film speed;
wherein said exposure controlling means includes means for calculating an effective aperture size relatively to the magnification of the image of the object.

15. An exposure system as claimed in claim 10, further comprising a focal plane shutter with a leading curtain and a trailing curtain, and timing means for initiating the projection of the artificial light of the prolonged flash light at the beginning of the travel of said leading curtain.

* * * * *